(12) United States Patent
Clarke et al.

(10) Patent No.: US 7,515,771 B2
(45) Date of Patent: Apr. 7, 2009

(54) METHOD AND APPARATUS FOR REDUCING BRIGHTNESS VARIATIONS IN A PANORAMA

(75) Inventors: Ian Clarke, North York (CA); Hui Zhou, Toronto (CA); Puneet Khanduri, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 600 days.

(21) Appl. No.: 11/207,365

(22) Filed: Aug. 19, 2005

(65) Prior Publication Data

US 2007/0041656 A1  Feb. 22, 2007

(51) Int. Cl.
 *G06K 9/36* (2006.01)
 *G06K 9/40* (2006.01)
(52) U.S. Cl. .................................. 382/284; 382/274
(58) Field of Classification Search ........... 382/27–275, 382/284; 358/487, 450, 540, 3.26–3.27; 345/630, 426, 589, 631; 348/36, 229.1, 222.1
See application file for complete search history.

(56) References Cited

U.S. PATENT DOCUMENTS

| | | | |
|---|---|---|---|
| 5,828,793 A | 10/1998 | Mann | |
| 6,128,108 A | 10/2000 | Teo | |
| 6,249,616 B1 | 6/2001 | Hashimoto | |
| 6,385,349 B1 | 5/2002 | Teo | |
| 6,404,516 B1 | 6/2002 | Edgar | |
| 6,507,415 B1 | 1/2003 | Toyoda et al. | |
| 6,687,400 B1 | 2/2004 | Szeliski | |
| 6,754,379 B2 | 6/2004 | Xiong et al. | |
| 6,959,118 B2* | 10/2005 | Griessl et al. | ............... 382/274 |
| 2003/0011622 A1 | 1/2003 | Yomdin et al. | |
| 2003/0030775 A1 | 2/2003 | Wagner et al. | |
| 2004/0008267 A1 | 1/2004 | Chen et al. | |
| 2004/0061774 A1 | 4/2004 | Wachtel et al. | |
| 2006/0115182 A1* | 6/2006 | Deng et al. | ................. 382/284 |

* cited by examiner

*Primary Examiner*—Sherali Ishrat
(74) *Attorney, Agent, or Firm*—Mark P. Watson

(57) ABSTRACT

In one embodiment, a method of reducing brightness variations in a panorama comprises calculating a gamma plane based on the panorama, blurring and normalizing the gamma plane and then applying the blurred and normalized gamma plane to the panorama thereby to reduce brightness variations therein.

15 Claims, 6 Drawing Sheets

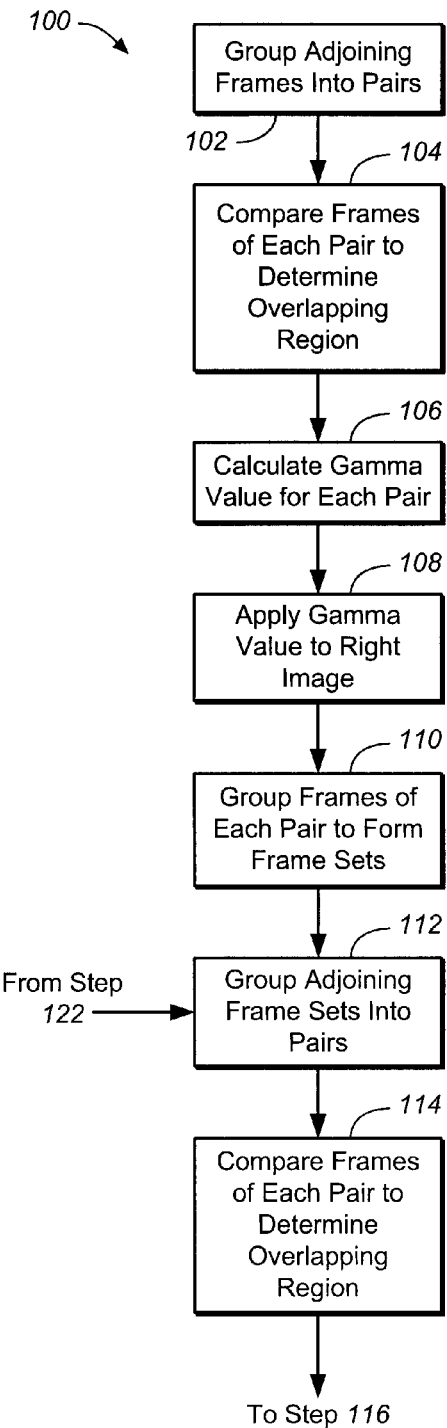
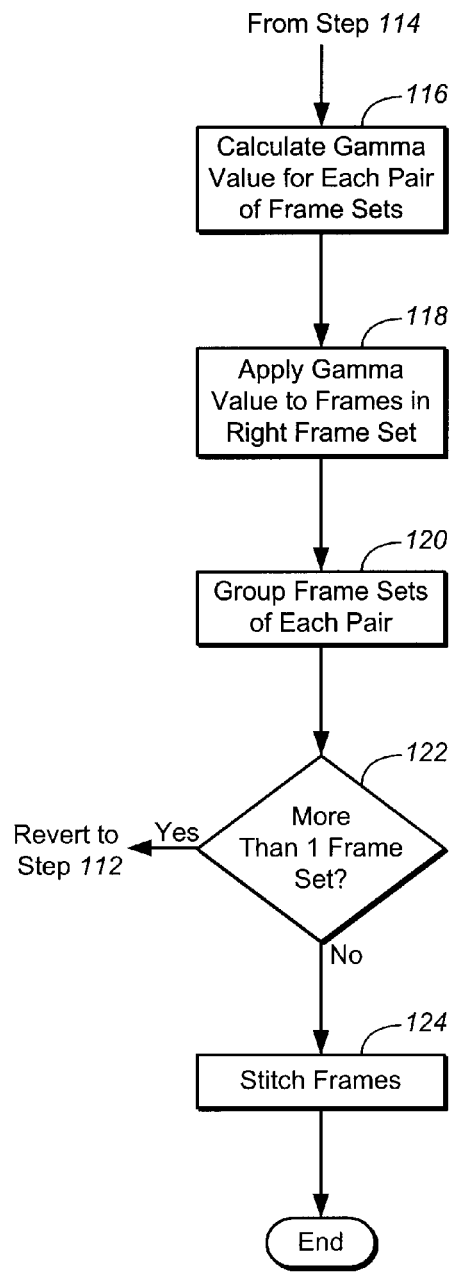
FIG._1a   FIG._1b

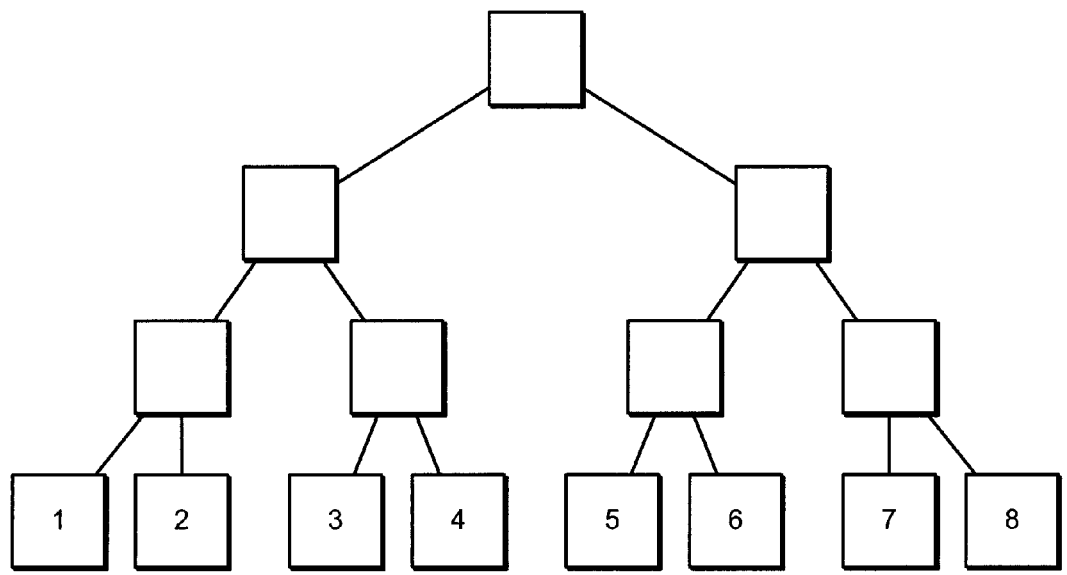
*FIG._2a*
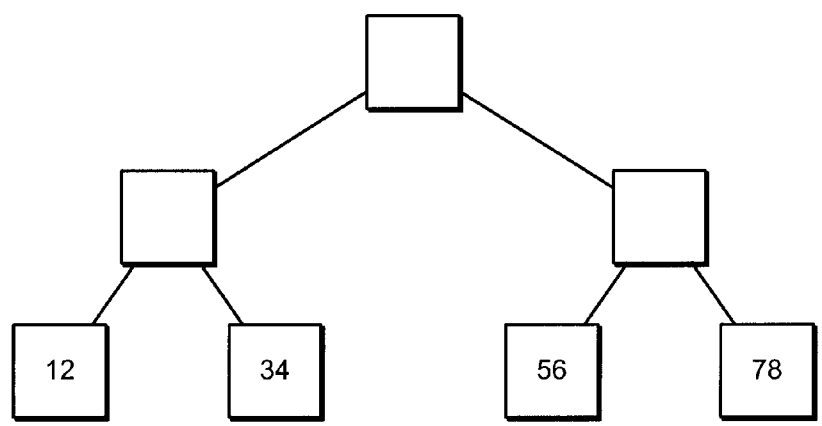
*FIG._2b*
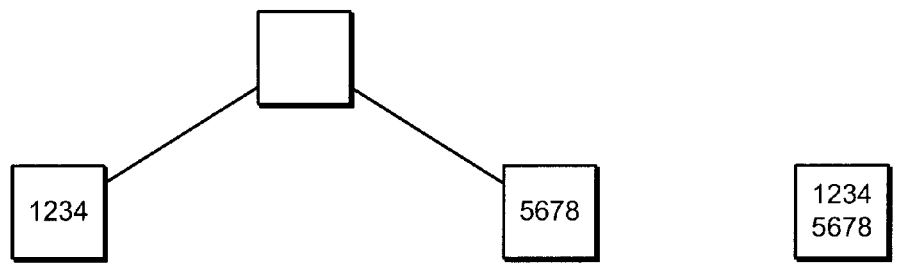
*FIG._2c*   *FIG._2d*

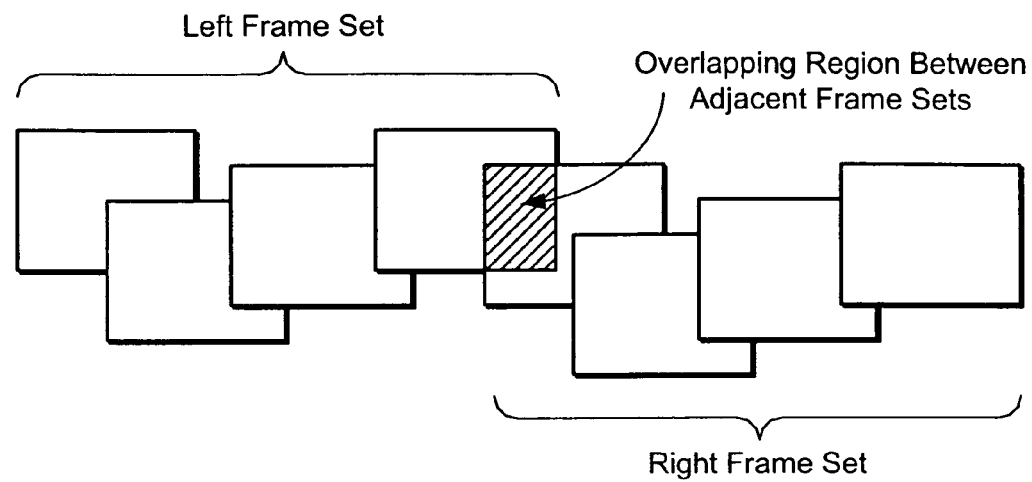
FIG._3a
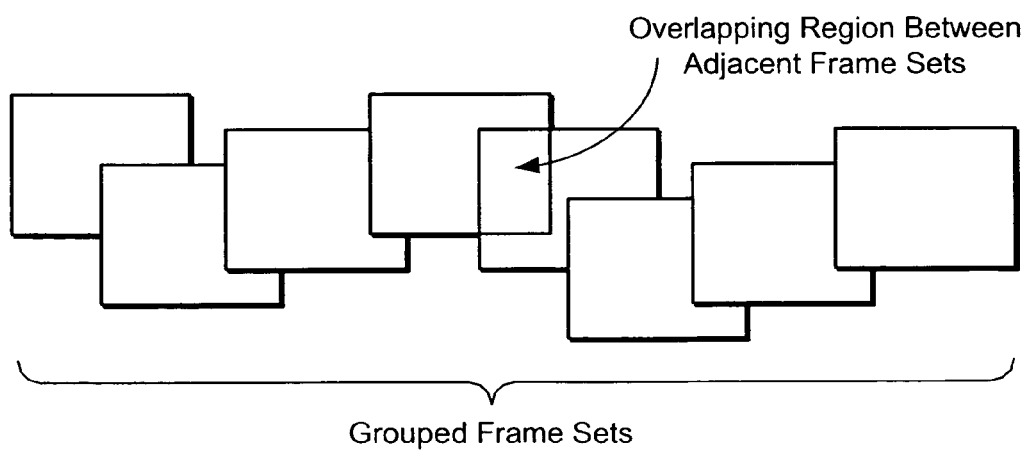
FIG._3b

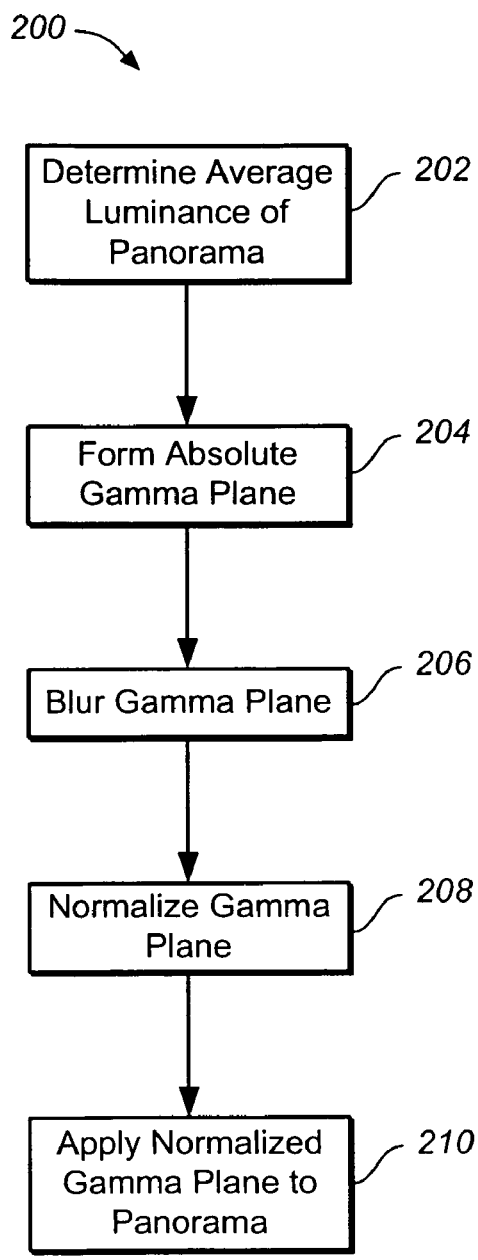
FIG._4

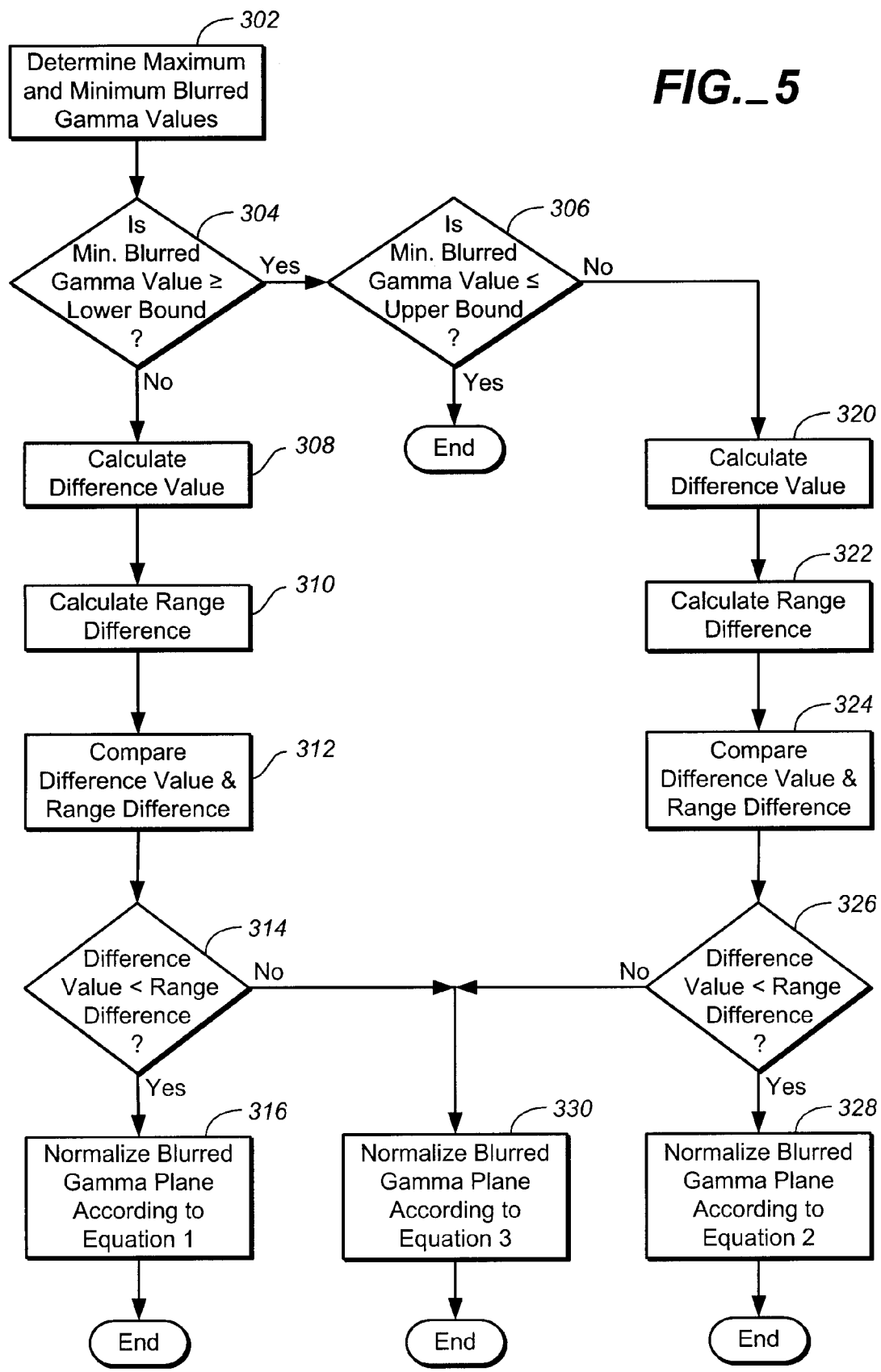
FIG._5

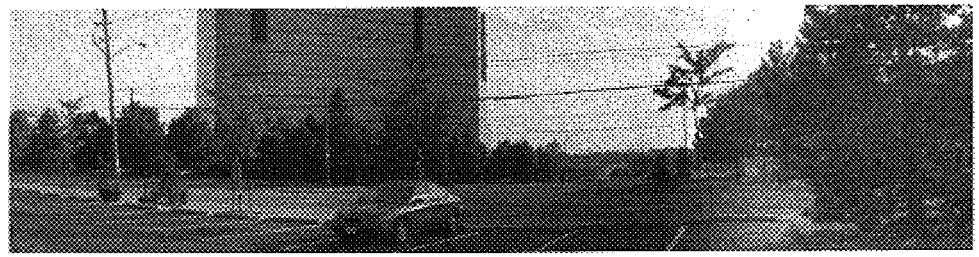
FIG. _6a
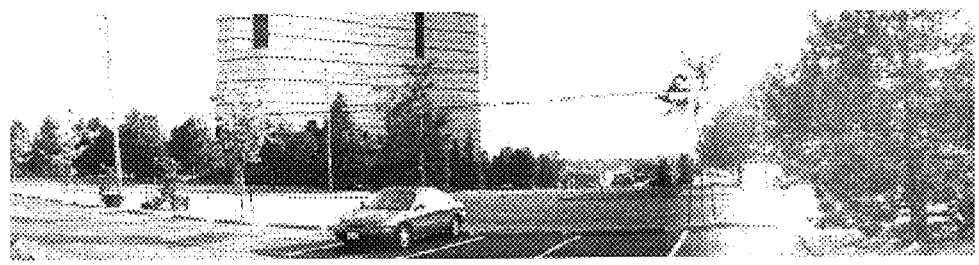
FIG. _6b
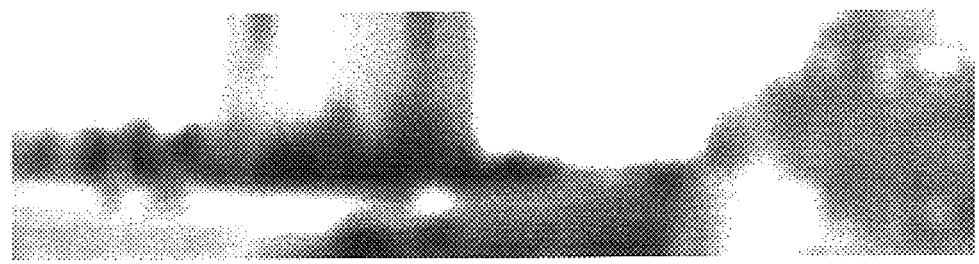
FIG. _6c
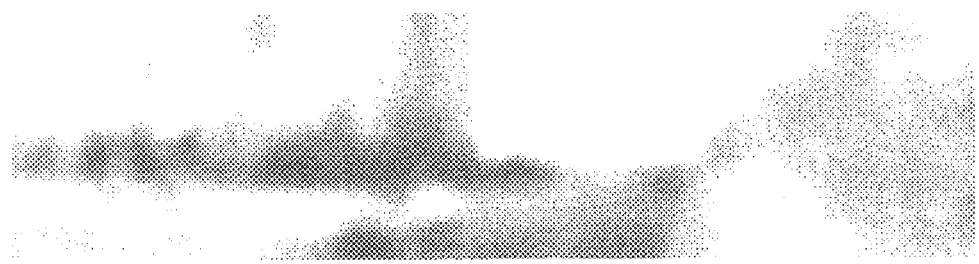
FIG. _6d
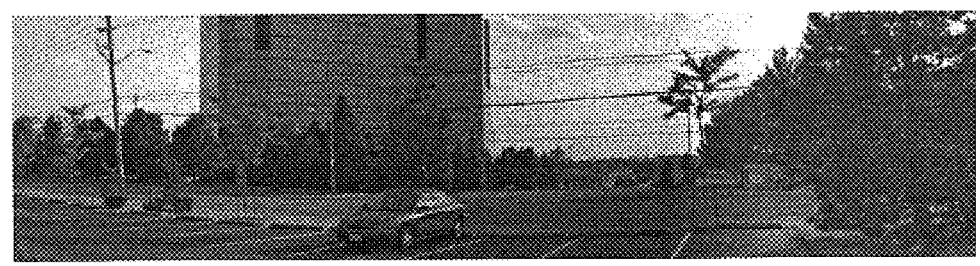
FIG. _6e

METHOD AND APPARATUS FOR REDUCING BRIGHTNESS VARIATIONS IN A PANORAMA

FIELD OF THE INVENTION

The present invention relates generally to image processing and in particular to a method, apparatus and computer program for reducing brightness variations in a panorama.

BACKGROUND OF THE INVENTION

Generating composite or panoramic images, or more simply panoramas, from sets of still images or sequences of video frames (collectively "frames") is known. In this manner, information relating to the same physical scene at a plurality of different time instants, viewpoints, fields of view, resolutions, and the like from the frames is melded to form a single wider angle image.

To generate a panorama, the various frames are geometrically and calorimetrically registered, aligned and then merged or stitched together to form a view of the scene as a single coherent image. During registration, each frame is analyzed to determine if it can be matched with previous frames. A displacement field that represents the offset between the frames is determined and then the frame is warped to the others to remove or minimize the offset.

In order for the panorama to be coherent, points in the panorama must be in one-to-one correspondence with points in the scene. Accordingly, given a reference coordinate system on a surface to which the frames are warped and combined, it is necessary to determine the exact spatial mapping between points in the reference coordinate system and pixels of each frame.

For any given panorama, the individual frames that are used to form the panorama may have been captured under very different conditions i.e. at different times of the day, different cloud coverage etc. and thus, may have very different brightness levels. As such noticeable differences in brightness may appear in the panorama at the regions of frame stitching. Techniques to reduce brightness inconsistencies in adjoining frames have been considered.

For example, U.S. Pat. No. 6,249,616 to Hashimoto discloses a method for making transformation in brightness globally consistent by treating transformation parameters computed on a local basis as estimates for the global parameters. A covariance matrix is then calculated to provide relative confidence in the estimate of each of the transformation parameters.

U.S. Pat. Nos. 6,385,349 and 6,128,108, to Teo disclose a method for stitching together images, which minimizes the "zone of influence" that adjacent images have on one another. Initially, two adjacent images A and B are merged into a combined image AB, and then the combined image AB is merged with a third image C to form a longer combined image ABC. This process is continued for each remaining image. The influence of each merged image is limited to the width of a single image.

Other techniques for reducing brightness variations in panoramas have also been considered. For example, U.S. Pat. No. 6,385,349 to Teo discloses a method for compositing images, which calculates modified intensities of individual images by using a calculated gamma as a modifying power on the intensity of the images. Correction parameters between adjacent images are determined in order to minimize the effect of lighting differences between the images.

U.S. Patent Application Publication No. 2004/0061774 to Wachtel et al. discloses a system and method for forming seamless composite images. The system comprises a number of imaging devices that are centrally controlled to capture respective images. A mean brightness is calculated from a center image, and is used as a base line for brightness coordination amongst the other images. As such, the intensities of the other images are adjusted based on the mean brightness.

U.S. Patent Application Publication No. 2004/0008267 to Chen et al. discloses a method for providing an image having an extended dynamic range whereby a number of limited dynamic range images of a particular scene are captured and combined.

U.S. Pat. No. 6,754,379 to Xiong et al. discloses a user interface for enabling a user to adjust image parameters such that constituent images in a composite image may be combined seamlessly.

U.S. Pat. No. 5,828,793 to Mann also discloses a method and apparatus for producing extended dynamic range digital images. Component images of the same scene taken at different exposures are received and combined to form the extended dynamic range image.

Although the above references disclose techniques for reducing brightness variations in a panorama, improvements are desired. It is therefore an object of the present invention to provide a novel method, apparatus and computer program for reducing brightness variations in a panorama.

SUMMARY OF THE INVENTION

Accordingly, in one aspect there is provided a method of reducing brightness variations in a panorama including a series of frames comprising:

grouping adjoining frames into sets and adjusting the frames in each set to compensate for brightness variations therebetween;

grouping adjoining frame sets and adjusting the frame sets in each group to compensate for brightness variations in the frame sets; and repeating the second grouping and adjusting until no adjoining frame sets remain.

In one embodiment, during the first grouping, pairs of adjoining frames are grouped into sets. During the first adjusting, for each grouped pair of frames the overlapping region of the frames is examined and the brightness variations of the overlapping region in each frame determined. The brightness level of one frame in the pair is used to adjust the brightness level of the other frame in the pair. In particular, a gamma value for the frame pair is calculated based on the brightness variations of the overlapping region in each frame and the gamma value is used to adjust the brightness level of the other frame.

During the second grouping, pairs of adjoining frame sets are grouped. During the second adjusting, for each grouped pair of frame sets the overlapping region of the frame sets is examined and the brightness variations of the overlapping region in each frame set determined. The brightness level of one frame set in the pair is used to adjust the brightness level of the other frame set in the pair. Again, a gamma value for the frame sets is calculated based on the brightness variations of the overlapping region in each frame set and the gamma value is used to adjust the brightness level of the other frame set.

According to another aspect there is provided a method of reducing brightness variations in a panorama comprising:

calculating a gamma plane based on the panorama;

blurring the gamma plane; and applying the blurred gamma plane to the panorama thereby to reduce brightness variations therein.

In one embodiment, the gamma plane is a scaled projection of the luminance channel of the panorama. The gamma plane includes a gamma value corresponding to each pixel of the panorama with each gamma value being equal to the luminance value of the corresponding pixel divided by the average luminance value of all pixels forming the panorama.

During the blurring, a box filter is applied to each gamma value thereby to yield blurred gamma values. The maximum and minimum blurred gamma values are examined to determine if the maximum and minimum blurred gamma values fall within a specified range. If the maximum and/or minimum blurred gamma values are beyond the specified range, blurred gamma values are adjusted thereby to normalize the blurred gamma plane prior to the applying.

In particular, if the minimum blurred gamma value is beyond the lower bound of the specified range and if the difference between the maximum and minimum blurred gamma values is less than the difference between the upper and lower bounds of the specified range, each blurred gamma value is adjusted according to the equation:

Blurred Gamma Value+Lower Bound−Determined Minimum Blurred Gamma Value.

If the maximum blurred gamma value is beyond the upper bound of the specified range and if the difference between the maximum and minimum blurred gamma values is less than the difference between the upper and lower bounds of the specified range, each blurred gamma value is adjusted according to the equation:

Blurred Gamma Value+Upper Bound−Determined Maximum Blurred Gamma Value.

If the difference between the maximum and minimum blurred gamma values is greater than the difference between the upper and lower bounds of the specified range, each blurred gamma value is adjusted according to the equation:

Lower Bound+(Blurred Gamma Value−Determined Minimum Blurred Gamma Value)*Range Difference/Difference Value.

During the applying, each pixel P[R,G,B] is modified according to the equation:

$$255*(P[R,G,B]/255)^{Corresponding\ Normalized\ Blurred\ Gamma\ Value}\ of\ Panorama$$

According to yet another aspect there is provided an apparatus for reducing brightness variations in a panorama including a series of frames comprising:

a frame grouper initially grouping adjoining frames into sets and then grouping adjoining frame sets; and a frame adjuster initially adjusting the adjoining frames in each set to compensate for brightness variations therebetween and then adjusting adjoining frame sets to compensate for brightness variations therebetween, said frame grouper and frame adjuster acting on adjoining frame sets until no adjoining frame sets remain.

According to yet another aspect there is provided an apparatus for reducing brightness variations in a panorama comprising:

a gamma plane calculator calculating a gamma plane based on the panorama;

a blurrer and normalizer blurring and normalizing the gamma plane; and a brightness adjuster applying the blurred and normalized gamma plane to the panorama thereby to reduce brightness variations therein.

According to still yet another aspect there is provided a computer readable medium embodying a computer program for reducing brightness variations in a panorama, said computer program comprising:

computer program code for grouping adjoining frames into sets and adjusting for brightness variations in the frames of each set;

computer program code for grouping adjoining frame sets and adjusting for brightness variations in the frame sets; and computer program code for repeating the second grouping and adjusting until no adjoining frame sets remain.

According to still yet another aspect of the present invention there is provided a computer readable medium embodying a computer program for reducing brightness variations in a panorama, said computer program comprising:

computer program code for calculating a gamma plane based on the panorama;

computer program code for blurring and normalizing the gamma plane; and computer program code for applying the blurred and normalized gamma plane to the panorama thereby to reduce brightness variations therein.

In one embodiment, by compensating for brightness variations between adjacent frames and adjacent frame sets, long range global brightness inconsistencies in the panorama are avoided as propagation of brightness inconsistencies between any pair of frames is inhibited. In another embodiment, dark areas of the panorama are brightened and bright areas of the panorama are lightened allowing a viewer to look into shadows in the panorama without overexposing the panorama. Brightness variations in the panorama are therefore smoothed without losing shadow edges.

BRIEF DESCRIPTION OF THE DRAWINGS

Embodiments will now be described more fully with reference to the accompanying drawings in which:

FIGS. 1a and 1b are a flowchart showing the steps performed during brightness variation reducing in a panorama;

FIGS. 2a to 2d are tree diagrams showing the brightness variation reducing technique of FIGS. 1a and 1b for a series of eight (8) frames used to form a panorama;

FIGS. 3a and 3b show the overlapping region of left and right frame sets and the application of the gamma value to the frames of the right frame set;

FIG. 4 is a flowchart showing the general steps performed during another embodiment of brightness variation reducing in a panorama;

FIG. 5 is a flowchart showing the steps performed during normalization of the blurred gamma plane; and FIGS. 6a to 6e show an input panorama and transformation of the input panorama during the brightness variation reducing method of FIG. 4.

DETAILED DESCRIPTION OF THE EMBODIMENTS

In the following description, embodiments of a method, apparatus and computer program for reducing brightness variations in a panorama are provided. In one embodiment during brightness variation reducing, adjoining frames are grouped into sets and the frames in each set are adjusted to compensate for brightness variations therebetween. Adjoining frame sets are then grouped and the frame sets in each group are adjusted to compensate for brightness variations between the frame sets. The grouping and adjusting of frame sets is performed until no adjoining frame sets remain. In another embodiment during brightness variation reducing, a gamma plane based on the panorama is calculated. The gamma plane is then blurred and if necessary, normalized. The blurred and normalized gamma plane is then applied to the panorama thereby to reduce brightness variations therein.

The brightness variation reducing methods and apparatuses may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

Turning now to FIGS. 1a and 1b, a flowchart showing the general steps performed during brightness variation reducing in a panorama is shown and is generally identified by reference numeral 100. With the frames to be used to form the panorama arranged in the desired serial order, the frames in the series are initially grouped into pairs, with each pair including two adjoining frames in the series (step 102). The frames of each pair are compared to determine the overlapping region of the frames (step 104). For each frame pair, a gamma value is calculated for the overlapping region (step 106). During calculation of the gamma value, the average intensity of pixels in the overlapping region of the left frame in the pair is divided by the average intensity of pixels in the overlapping region of the right frame in the pair. The calculated gamma value is then applied to the pixels of the right frame in the pair to vary the brightness therein (step 108). The left frame and brightness adjusted right frame are then grouped to form a frame set (step 110).

Following step 110, the resulting frame sets are grouped into pairs, with each pair including two adjoining frame sets (step 112). The frame sets of each pair are compared to determine the overlapping region of the frame sets (step 114). For each pair of frame sets, a gamma value is calculated for the overlapping region (step 116). The calculated gamma value is then applied to the pixels of the frames in the right frame set to vary the brightness therein (step 118). The left frame set and brightness adjusted right frame set are then grouped to form another frame set (step 120). A check is then made to determine whether more than one frame set exists (step 122). If not, the brightness variations between the adjoining frames forming the panorama are deemed to be compensated for placing the adjoining frames into condition for stitching. The frames are then stitched to form an output panorama with reduced brightness inconsistencies (step 124).

At step 122, if more then one frame set still exists, the method reverts to step 112 and the above steps are re-performed. As will be appreciated, steps 112 to 122 are repeated until only one frame set including all of the frames in the series exists.

FIGS. 2a to 2d are tree diagrams showing the above-described pairwise brightness variation reducing technique for a series of eight (8) frames used to form a panorama. As will be appreciated, following steps 102 to 110, frames 1 and 2, frames 3 and 4, frames 5 and 6, and frames 7 and 8 are grouped to form four (4) frame sets as shown in FIG. 2b. Following steps 112 to 120, frames 1 to 4 and frames 5 to 8 are grouped to form two (2) frame sets as shown in FIG. 2c. As more than one frame set still exists, steps 112 to 120 are performed again yielding a single frame set including all eight (8) frames as shown in FIG. 2d.

FIGS. 3a and 3b show the overlapping region of left and right frame sets in a group and the application of the gamma value to the frames of the right frame set at step 118 thereby to reduce brightness variations between the left and right frame sets.

As will be appreciated, by compensating for brightness variations between adjacent frames and adjacent frame sets, long range global brightness inconsistencies in the panorama can be avoided. It has also been found that compensating for brightness locally rather than globally yields better panorama results.

Turning now to FIG. 4, a flowchart showing the general steps performed during another embodiment of brightness variation reducing in a panorama is shown and is generally identified by reference numeral 200. In this method, brightness variations are not compensated for locally but rather globally. During brightness variation reducing, the average luminance of the pixels forming the panorama is determined (step 202). The luminance (L) of a pixel is defined as:

$$L=(77*\text{Red Channel}+150*\text{Green Channel}+29*\text{Blue Channel})/255$$

With the average luminance known, for each pixel in the panorama, a gamma value is calculated by dividing the luminance of the pixel by the known average luminance. The calculated gamma values are used to form an absolute gamma plane that is in effect a scaled projection of the panorama luminance i.e. the absolute gamma plane has a pixel-wise one to one spatial correspondence with the panorama (step 204).

Once formed, the absolute gamma plane is then blurred (step 206). During blurring, a fourteen (14) by fourteen (14) square filter box centered on each gamma value is examined and the average gamma value in the filter box is determined and used to replace the subject gamma value. With the gamma plane blurred, the gamma plane is then normalized if necessary to maintain the gamma values within a specified range (step 208). In this example, the gamma value range extends from a lower bound equal to 0.6 to an upper bound equal to 1.8.

During normalization as shown in FIG. 5, the blurred gamma plane is evaluated to determine the maximum and minimum gamma values in the blurred gamma plane (step 302). The minimum and maximum gamma values are then examined to determine if the minimum gamma value is greater than or equal to the lower bound (i.e. 0.6) and/or if the maximum gamma value is less than or equal to the upper bound (i.e. 1.8) (steps 304 and 306). If these conditions are met, the blurred gamma plane is deemed to be normalized.

If the minimum gamma value is determined to be less than the lower bound at step 304, a difference value is calculated by subtracting the determined minimum gamma value from the determined maximum gamma value (step 308). The difference between the upper bound and lower bound of the specified gamma value range is also calculated (step 310). In this example, the range difference is equal to 1.2 (i.e. 1.8–0.6).

The difference value and the range difference are then compared (steps 312 and 314). If the difference value is less than the range difference, each gamma value in the blurred gamma plane is normalized (step 316) according to Equation 1 as follows:

Gamma Value+Lower Bound−Determined Minimum Gamma Value

If the maximum gamma value is determined to be greater than the upper bound, a difference value is calculated by subtracting the determined minimum gamma value from the determined maximum gamma value (step 320). The difference between the upper and lower bounds of the specified gamma value range is also calculated (step 322).

The difference value and the range difference are then compared (steps 324 and 326). If the difference value is less than the range difference, each gamma value in the blurred gamma plane is normalized (step 328) according to Equation 2 as follows:

Gamma Value+Upper Bound−Determined Maximum Gamma Value

At either step 314 or 326, if the difference value is greater than the range difference, each gamma value in the blurred gamma plane is normalized (step 330) according to Equation 3 as follows:

Lower Bound+(Gamma Value−Determined Minimum Gamma Value)*Range Difference/Difference Value With the blurred gamma plane normalized, the normalized blurred gamma plane is applied to the pixels of the panorama thereby to generate an output panorama that is adjusted to compensate for brightness variations in the panorama (step 210). Each normalized and blurred gamma value in the gamma plane is therefore used as a gamma factor to modify its corresponding pixel of the panorama. In particular, each pixel P[R,G,B] of the output panorama is calculated according to Equation 4 as follows:

255*(P[R,G,B] of Input Panorama/ 255)$^{Corresponding\ Normalized\ and\ Blurred\ Gamma\ Value}$ FIGS. 6a to 6e show an input panorama and the transformation of the panorama during brightness variation reducing. In particular, FIG. 6b shows the absolute gamma value plane derived from the input panorama of FIG. 6a during step 204. FIG. 6c shows the blurred gamma plane generated during step 206 and FIG. 6d shows the normalized and blurred gamma plane generated during step 208. The output panorama is shown in FIG. 6e after application of the normalized and blurred gamma plane of FIG. 6d to the panorama of FIG. 6a at step 210.

As will be appreciated, this brightness variation reducing technique brightens dark areas of the panorama and lightens bright areas of the panorama allowing a viewer to look into shadows in the panorama without overexposing the panorama. Brightness variations in the panorama are therefore smoothed without losing shadow edges.

If desired, a larger or smaller filter can be used to generate the gamma values of the blurred gamma plane. Also, although specific upper and lower bounds are described, which have been found to work well through experimentation, other upper and lower bounds for the specified range may be used.

Although embodiments for panorama brightness variation reducing have been described, those of skill in the art will appreciate that variations and modifications may be made without departing from the spirit and scope thereof as defined by the appended claims.

What is claimed is:

1. A method of reducing brightness variations in a panorama including a series of frames comprising: using a computer to perform the following steps:
grouping adjoining frames into sets and adjusting the frames in each set to compensate for brightness variations therebetween;
grouping adjoining frame sets and adjusting the frame sets in each group to compensate for brightness variations in the frame sets; and
repeating the second grouping and adjusting until no adjoining frame sets remain.

2. The method of claim 1 wherein during said adjusting, brightness variations in the overlapping regions of frames are detected.

3. The method of claim 2 wherein during said first grouping, pairs of adjoining frames are grouped into sets.

4. The method of claim 3 wherein during said first adjusting, for each grouped pair of frames the overlapping region of the frames is examined and the brightness variations of the overlapping region in each frame determined, the brightness level of one frame in said pair being used to adjust the brightness level of the other frame in the pair.

5. The method of claim 4 wherein a gamma value for the frame pair is calculated based on the brightness variations of the overlapping region in each frame, the gamma value being used to adjust the brightness level of said other frame.

6. The method of claim 5 wherein said gamma value is calculated by dividing the average intensity of pixels in the overlapping region of said one frame by the average intensity of pixels in the overlapping region of said other frame.

7. The method of claim 6 wherein during said second grouping, pairs of adjoining frame sets are grouped.

8. The method of claim 7 wherein during said second adjusting, for each grouped pair of frame sets the overlapping region of the frame sets is examined and the brightness variations of the overlapping region in each frame set determined, the brightness level of one frame set in said pair being used to adjust the brightness level of the other frame set in the pair.

9. The method of claim 8 wherein a gamma value for the frame sets is calculated based on the brightness variations of the overlapping region in each frame set, the gamma value being used to adjust the brightness level of said other frame set.

10. The method of claim 9 wherein said gamma value is calculated by dividing the average intensity of pixels in the overlapping region of said one frame set by the average intensity of pixels in the overlapping region of said other frame set.

11. The method of claim 2 wherein during said second grouping, pairs of adjoining frame sets are grouped.

12. The method of claim 11 wherein during said second adjusting, for each grouped pair of frame sets the overlapping region of the frame sets is examined and the brightness variations of the overlapping region in each frame set determined, the brightness level of one frame set in said pair being used to adjust the brightness level of the other frame set in the pair.

13. The method of claim 12 wherein a gamma value for the frame sets is calculated based on the brightness variations of the overlapping region in each frame set, the gamma value being used to adjust the brightness level of said other frame set.

14. The method of claim 13 wherein said gamma value is calculated by dividing the average intensity of pixels in the overlapping region of said one frame set by the average intensity of pixels in the overlapping region of said other frame set.

15. An apparatus for reducing brightness variations in a panorama including a series of frames comprising:

a frame grouper initially grouping adjoining frames into sets and then grouping adjoining frame sets; and a frame adjuster initially adjusting the adjoining frames in each set to compensate for brightness variations therebetween and then adjusting adjoining frame sets to compensate for brightness variations therebetween, said frame grouper and frame adjuster acting on adjoining frame sets until no adjoining frame sets remain.

* * * * *